United States Patent
Dai et al.

(10) Patent No.: US 7,224,911 B2
(45) Date of Patent: May 29, 2007

(54) ADAPTIVE DISTORTION COMPENSATION IN OPTICAL FIBER COMMUNICATION NETWORKS

(75) Inventors: Fa Dai, Auburn, AL (US); Mark A. Pacek, Pasadena, MD (US)

(73) Assignee: JDS Uniphase Corporation, Milpitas, CA (US)

( * ) Notice: Subject to any disclaimer, the term of this patent is extended or adjusted under 35 U.S.C. 154(b) by 778 days.

(21) Appl. No.: 10/161,747

(22) Filed: Jun. 5, 2002

(65) Prior Publication Data

US 2003/0011847 A1  Jan. 16, 2003

Related U.S. Application Data

(60) Provisional application No. 60/296,551, filed on Jun. 7, 2001.

(51) Int. Cl.
 H04B 10/00  (2006.01)
(52) U.S. Cl. .................. 398/209; 398/155
(58) Field of Classification Search ......... 398/184, 398/192–198, 155, 202–214
See application file for complete search history.

(56) References Cited

U.S. PATENT DOCUMENTS

| | | | |
|---|---|---|---|
| 5,557,468 A | 9/1996 | Ip | 359/615 |
| 5,602,666 A | 2/1997 | Ishikawa et al. | 359/161 |
| 5,701,188 A | 12/1997 | Shigematsu et al. | 359/161 |
| 5,930,414 A | 7/1999 | Fishman et al. | 385/11 |
| 6,498,537 B1 * | 12/2002 | Watanabe | 331/25 |
| 6,509,801 B1 * | 1/2003 | Lao et al. | 331/17 |
| 6,728,491 B1 * | 4/2004 | Ooi et al. | 398/147 |

OTHER PUBLICATIONS

Electronic Letters, Jun. 19, 1997, vol. 33, No. 13, pp. 1157-1159, "Component For Second-Order Compensation of Polarieation-Mode Dispersion", J. Patscher & R. Eckhardt.

OFC 94 Technical Digest, Optical Fiber Communication, "A Polarization-Mode-Dispersion Equalization Experiment Using A Variable Equalizing Optical Circuit Controlled By A Pulse-Waveform-Comparison Algorithm", vol. 4, 1994 Technical Digest Series, Feb. 20-25, 1994, pp. 62-64.

* cited by examiner

*Primary Examiner*—Agustin Bello
(74) *Attorney, Agent, or Firm*—Allen, Dyer, Doppelt, Milbrath & Gilchrist, P.A.

(57) ABSTRACT

An apparatus for adaptively receiving, compensating, and transmitting data in optical fiber communication networks are provided. A receiver according to this invention includes at least one optical device for compensating distortion in a channel of an optical signal, at least one photodetector circuit for converting the optical signal into an electrical signal, at least one electronic device for further compensating the distortion in the electronic signal, a clock and data recovery circuit for generating a recovered data signal and a clock signal from the electronic signal, and a post-processing circuit.

30 Claims, 4 Drawing Sheets

ADAPTIVE DISTORTION COMPENSATION IN OPTICAL FIBER COMMUNICATION NETWORKS

This application claims the benefit of U.S. Provisional Application No. 60/296,551 filed Jun. 7, 2001.

FIELD OF THE INVENTION

The present invention relates to adaptively compensating distortion in optical signals, and particularly to integrated compensation solutions for polarization mode dispersion, chromatic dispersion, and the like, in optical fiber communication networks.

BACKGROUND OF THE INVENTION

Polarization mode dispersion (hereinafter, "PMD") is a signal distortion effect that can limit optical fiber transmission distances at high bit rates, such as 10 Gbits/sec (hereinafter, "Gbps") and above. PMD is caused by variations in birefringence along the optical path that causes the orthogonal optical signal polarization modes to propagate at different velocities. The primary cause of PMD is the asymmetry of the fiber-optic strand. Fiber asymmetry may be inherent in the fiber from the manufacturing process, or it may be a result of mechanical stress on the deployed fiber. The inherent asymmetries of the fiber are fairly constant over time. In other cases the statistical nature of PMD results in unexplained PMD changes that can last for much longer periods of time, with the potential for prolonged degradation of data transmission.

Components used to split, combine, multiplex, demultiplex, amplify, reroute, or otherwise modify optical signals can also contribute to PMD.

PMD is dynamic and statistical in nature, making it a particularly difficult problem to solve. The statistical nature of PMD is such that it changes over time and varies with wavelength. Thermal and mechanical effects, such as diurnal heating and cooling, vibration from passing vehicles, fiber movement in aerial spans, and cabling disturbances by technicians e.g., during patch panel rerouting) have all been shown to cause PMD. These events can momentarily increase the PMI) in a fiber span and briefly affect the transmission quality of an optical signal. Because these effects are sometimes momentary, they are hard to isolate and diagnose. In fact, these types of problems are sometimes known as "ghosts" because they occur briefly and mysteriously, and cannot be replicated during a system maintenance window.

In long fiber spans, enough PMD can accumulate such that bits arriving at the receiver begin to interfere with another, degrading transmission quality. This effect becomes more pronounced as transmission rates get higher (and bit periods get shorter). Generally, PMD exceeding ten percent of the bit period is considered detrimental. At 10 Gbps, the bit period is 100 psecs, which implies that any span that exhibits PMD greater than 10 psecs may be "PMD-limited." This generally only occurs in extraordinarily long spans, and those incorporating older fiber.

To date, spans deploying 10 Gbps rates have been specially-selected or "link-engineered" to low PMD fibers. As the 10 Gbps data transmission rate standard becomes more prevalent, however, PMD challenged fibers must be deployed, or lit, and specialized engineering resources may become an alternative, though cost prohibitive. Moreover, PMD is expected to be a significant and growing concern in systems transmitting information at 40 Gbps and higher. For example, at 40 Gbps, the PMD tolerance is only 2.5 psecs. At this transmission rate, every span is potentially PMD-limited.

Regeneration, inverse multiplexing, and PMD compensation are three ways of reducing the effects of PMD.

Regeneration involves, at each termination point of a span, converting the light into an electrical signal and then reconverting the electrical signal back into an optical signal for transmission along the next span. Regeneration of an optical signal is performed on each wavelength independently; meaning that each of the signals carried by a single fiber must demultiplexed, converted and reconverted, and then remultiplexed with the other wavelengths. Regeneration of optical signals was a widely used approach on all optical-transmission systems until the advent of optically amplified dense wavelength division multiplexed ("DWDM") systems in the mid 1990's. Before that time, regenerators limited PMD and boosted the power level of the optical signal.

Once multiple wavelengths appeared on long-haul fibers, however, optical amplifiers replaced the use of regenerators for boosting signal power across multiple wavelengths. Although optical amplifiers are economical, they do not reduce PMD and may actually increase it. Therefore, optical amplification alone may not be an option on fiber spans with high PMD.

Inverse multiplexing is a second approach and is a generic term for the transport off a signal from a subscriber across multiple paths in the network at a lower bandwidth rate than it was received from the subscriber. A common example of inverse multiplexing is an application that has been around for many years in the access network: the transport of 10 Mbps Ethernet links across multiple DS-1 transmission paths. Inverse multiplexing for support of 10 Gbps services operates by disassembling a subscriber's service (e.g., an OC-192c transmission from a core router) for transport across the network by an inverse-multiplexing device. The service could be disassembled into 2.5 Gbps "chunks" for transport, then reassembled at the destination point and handed off to the destination core router. Because PMD is less of an issue at 2.5 Gbps, inverse multiplexing provides a "workaround" solution for moving 10 Gbps across a fiber network with PMD issues.

In the third approach, compensation for PMD fixes the optical signal before it is read and interpreted by the receiver at the end of the fiber path. PMD compensation methods have been explored since the potential bandwidth limitation of PMD was first recognized in the mid-1990's. Early generations of PMD compensators, however, were limited in performance, addressing only a small range of PMD.

A somewhat related type of optical distortion is chromatic dispersion (hereinafter, "CD"), which, unlike PMD, remains nearly static over time. CD causes optical pulses launched along the transmission medium to propagate at different velocities for different wavelengths of light. For example, some frequency components of a launched optical pulse will propagate slower than other frequency components, thus spreading out the pulse. Some of the methods used to compensate for CD in optical fibers are described by Ip U.S. Pat. No. 5,557,468, Ishikawa et al. U.S. Pat. No. 5,602,666, and Shigematsu et al. U.S. Pat. No. 5,701,188, all of which are hereby incorporated by reference in their entireties. Moreover, products are commercially available for providing broadband variable CD compensation (see, e.g., the dispersion compensator sold under the trademark POWERSHAPER™ by Avanex Corp. of Freemont, Calif.).

With respect to both PMD and CD, optical pulses are assumed to be bandwidth limited, and that the corresponding compensation corrects for differential delay.

Ozeki et al. describe a system that compensates delay caused by PMD in "A Polarization-Mode-Dispersion Equalization Experiment Using A Variable Equalizing Optical Circuit Controlled By A Pulse-Waveform-Comparison Algorithm," *OFC'94 Technical Digest*, at 62–64 (1994), which is hereby incorporated by reference in its entirety. According to Ozeki et al., the system compensates for differential group delay (hereinafter, "DGD") by subjecting a distorted optical signal to a polarization transformation, transmitting the transformed signal through a birefringent fiber, subjecting the transmitted signal to one or two additional polarization transformations, and transmitting the transformed signal through another birefringent fiber. Patscher et al. describes another compensation scheme similar to Ozeki et al. in "A Component For Second-Order Compensation Of Polarisation-Mode Dispersion" in *Electronics Letters*, Vol. 33, No. 13., at 1157–1159 (Jun. 19, 1997). Neither publication, however, describes how the polarization state of an optical signal is transformed.

Fishman et al. U.S. Pat. No. 5,930,414, which is hereby incorporated by reference in its entirety, describes a system for compensating first-order PMD. Because PMD is dynamic, the system shown by Fishman et al. adaptively compensates for DGD by varying the orientation of a birefringence element.

The apparatus shown by Fishman et al. includes a polarization transformer coupled in series with a birefringence element. The distorted optical signal is input to the polarization transformer. The birefringence element provides a compensated optical signal, which is optically tapped and converted by a photodetector into an electrical signal. The electrical signal is then amplified and the distortion in the amplified photocurrent is measured by a distortion analyzer that generates a control voltage in accordance with the measured distortion. The distortion analyzer outputs a control voltage that approaches a maximum value when distortion in the optical signal due to first order PMD approaches a minimum. The control voltage is provided as feedback to the polarization transformer and the birefringence element in a feedback loop. The polarization transformer and the birefringence element are thus continually varied via feedback control to compensate for optical distortion resulting from PMD.

It is known that purely optical PMD compensation can be performed using an RF spectrum feedback. There are, however, several complicating factors that make RF feedback techniques difficult to execute. For example, the PMD spectrum at and near the data bit period can be ambiguous because of strong inter-symbol interference effects of adjacent pulses. Also, second order PMD tends to complicate the compensation process for at least two reasons: (1) the reduced sensitivity of the spectral intensity as a function of DGD and (2) the non-monotonic behavior of the spectrum.

Purely electronic PMD feedback techniques are also problematic. Electronic equalizers, for example, normally rely on error detection to generate proper feedback signals. Accurate error detection, however, is very difficult when a large amount of distortion is present. Moreover, each gain stage of an electronic equalizer must maintain its linearity over supply voltage and temperature ranges, as well as any processing variations, which are substantial challenges for high data rate applications.

Thus, it is difficult to totally eliminate PMD and CD using optical compensators or electronic equalizers alone, especially at data transmission rates of 10 Gpbs or more.

It would therefore be desirable to provide methods and apparatus for adaptive optical dispersion compensation for data transmission rates of 10 Gbps or more, particularly using both optical and electronic compensation means.

It would also be desirable to provide integrated apparatus and methods for adaptively compensating for dispersion impairment due to PMD, CD and the like, thereby enabling high-speed optical data transfer with minimal data transmission errors.

SUMMARY OF THE INVENTION

It is therefore an object of the present invention to provide methods and apparatus for adaptive dispersion compensation for data transmission rates of 10 Gbps or more.

It is also an object of the present invention to provide integrated apparatus and methods for dynamically compensating for dispersion impairment due to PMD and CD using adaptive receivers and transmitters, thereby enabling high-speed optical data transfer with minimal data transmission errors.

In accordance with this invention, integrated solutions for CD and PMD compensation in high data rate fiber communication networks are provided. The invention preferably employs both optical and electronic compensation techniques.

An application specific integrated circuit (hereinafter, "ASIC" or "IC") according to this invention can include a transversal filter and a decision feedback equalizer embedded in clock and data recovery (hereinafter, "CDR") decision circuitry with adaptively adjustable thresholds and sample time. The IC can provide a decision error count, which can be used as an adaptive feedback control signal for optical and electronic dispersion compensation units. An IC according to this invention can, for example, be implemented using SiGe and InP processing, which provides an effective way for dispersion compensation at OC-192 and OC-768 transmission rates, and above.

Dispersion compensation according to this invention at high data transmission rates, (e.g., 40 Gbps), has a number of advantages over the prior art.

Although optical compensators normally provide better performance than electronic equalizers, optical compensators are generally much more expensive. Among optical compensation schemes, lithium niobate based optical PMD compensator performance can be better than lead lanthanum zirconium titanate ("PLZT"), liquid crystal, and fiber squeezer based optical dispersion compensators because lithium niobate generally has faster response times. Nonetheless, a lithium niobate (crystal can be the most costly component of an optical compensator. Electronic compensators implemented in ICs, however, are generally less expensive to build than optical compensators. Thus, an apparatus according to this invention can include both optical and electronic compensation means.

Thus, in accordance with one aspect of this invention, an adaptive receiver is provided that includes: (1) at least one optical device for compensating distortion in a channel of an optical signal, (2) at least one photodetector circuit for converting the optical signal into an electrical signal, (3) at least one electronic device for further compensating the distortion in the electronic signal, (4) a clock and data recovery circuit for generating a recovered data signal and a clock signal from the electronic signal, and (5) a post-processing circuit for error-correction in the recovered data signal.

In accordance with another aspect of this invention an adaptive transceiver is provided that includes a receiver substantially as described above, in combination with an adaptive transmitter for converting an electronic data signal into an optical data signal. The transmitter preferably includes a controllable polarization scrambler.

In one embodiment, the adaptive transceiver can include: (1) at least one adaptive optical distortion compensator, (2) a photodetector circuit having a circuit input coupled to said optical compensator output, (3) at least one adaptive electronic equalizer having an equalizer input coupled to the photodetector circuit output, (4) an eye opening measurement circuit having an input coupled to the equalizer, (5) an adaptive decision unit for converting analog data to digital data using dimensional information provided by the measurement circuit, (6) a clock and data recovery circuit for providing at least one recovered clock signal with an adjustable phase and a recovered data signal to a measurement circuit for comparison with another circuit, (7) a post-processing IC for processing dimensional information and providing feedback control signals to a compensating device, (8) an optical source capable of generating an optically modulated signal, and (9) a polarization scrambler coupled to the output of the optical source.

In accordance with yet another aspect of the present invention, a sample time measurement unit is provided. This circuit can either serve as the entire error measurement circuit, or as merely part of the eye-opening measurement circuit, depending on the amount, of feedback information desired. The sample time measurement unit preferably includes a left edge detector arid a right edge detector. The left edge detector includes a left delay unit for varying the phase of a left clock signal, a left comparator unit which compares a recovered data signal with a left error signal based on the left clock signal, and a left error counter for accumulating errors in the left error signal. The right edge detector is similar to the left edge detector.

In accordance with a further aspect of the present invention, an error detection circuit is provided for analyzing a data eye opening along both time and amplitude dimensions. The detection circuit includes the sample time measurement unit described above in combination with a threshold measurement unit, as described more fully in co-pending, commonly owned U.S. patent application Ser. No. 09/919,563, filed Jul. 31, 2001, and U.S. Provisional Patent Application No. 60/268,944, filed Feb. 15, 2001, which are hereby incorporated by reference in their entireties.

Therefore, the error detection circuit can measure the data eye opening in both the time and amplitude domains. By measuring one or both of these parameters, any received eye pattern can be well characterized for compensation and other purposes. Time domain error detection, when compared with spectral domain error detection, can provide a number of advantages:

First, time domain error detection provides a direct measurement of eye pattern distortion in the time domain, which is not always easily correlated with its respective spectral information within a certain bandwidth. This direct measurement overcomes the problems associated with the ambiguity and non-monotonic behavior of distorted spectra.

Second, time domain error detection circuitry can be easily integrated into a receiver's clock and data recovery IC at a relatively low incremental cost. In contrast, spectral error detection usually requires expensive RF filters and detectors that cannot be easily integrated in the IC.

Third, time domain error detection can measure the left, right, top, and bottom positions of a data eye-opening. This ability can be used to adaptively adjust the decision threshold and sample time. In contrast, spectral error detection cannot directly provide the information for adaptive thresholding and sampling.

In yet another aspect of the present invention, a clock and data recovery circuit is provided for generating at least one clock signal and a recovered data signal. The circuit includes a phase detector for providing phase error information, a low-pass loop filter for determining a loop performance and generating a filtered error signal, a voltage controlled oscillator for generating a substantially sinusoidal waveform in response to receiving the filtered error signal, and a tunable delay unit for tuning the phases of the clock signals. According to one embodiment, the clock and data recovery circuitry can generate a clock signal with adjustable quadrature phases. When a voltage controlled oscillator (hereinafter, "VCO") is incorporated in the clock and data recovery unit, the unit can operate at, for example, half of the data rate, which reduces the difficulty of designing high frequency circuits. In contrast, other types of phase detectors and VCOs cannot accomplish these functions. Moreover, VCOs that run at full data rates generally consume more power than those that run at fractional rates. Finally, unlike high data rate VCOs, use of low data rate VCOs can reduce high frequency interference in the ASIC.

BRIEF DESCRIPTION OF THE INVENTION

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
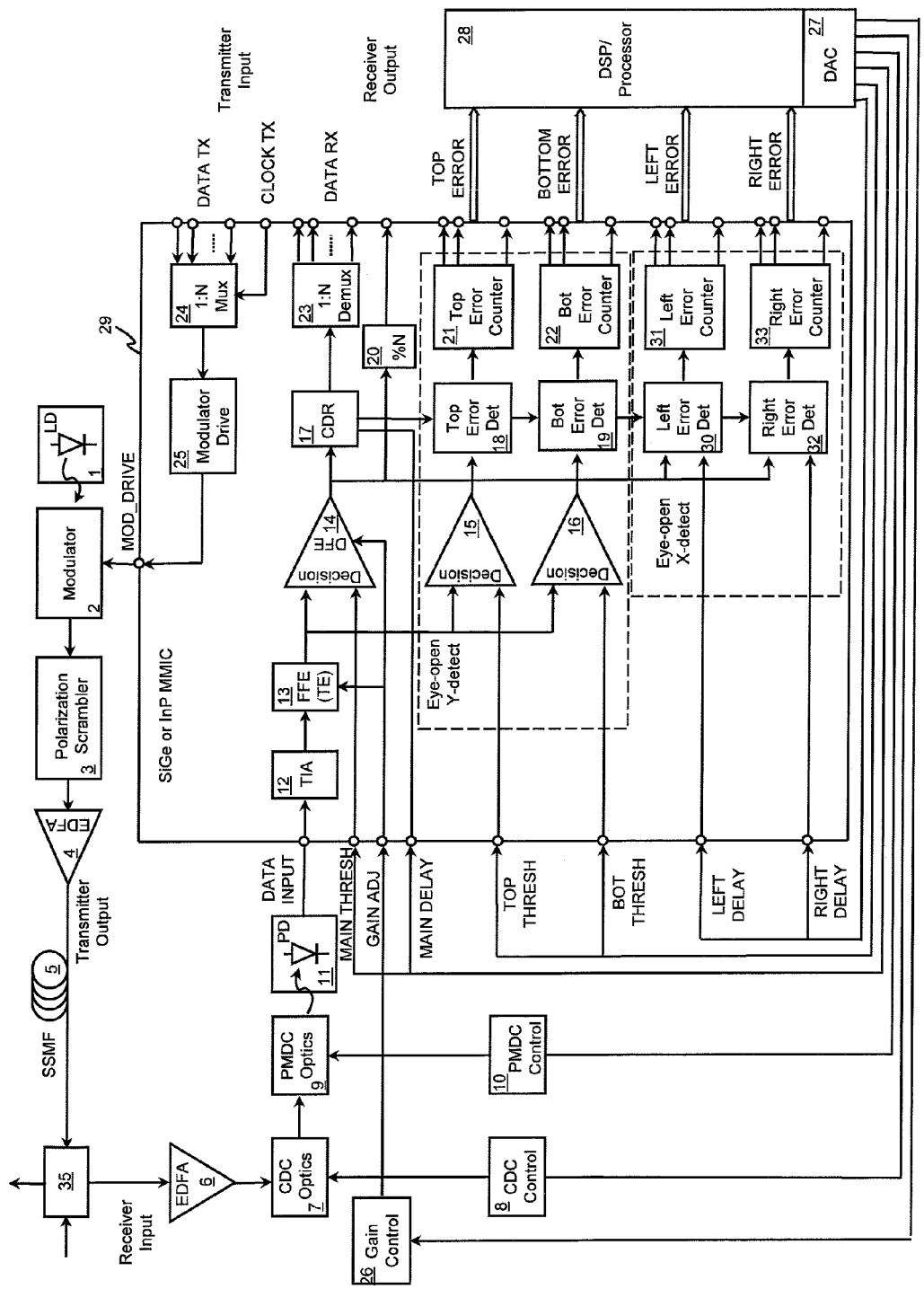
FIG. 1 shows a schematic diagram of a single chip integrated transceiver for hybrid dispersion compensation in accordance with this invention.

FIG. 1 shows a schematic diagram of an illustrative single chip solution for hybrid dispersion compensation and clock and data recovery in accordance with this invention. IC 29 can be fabricated using, for example, InP, SiGe or CMOS processing, depending on the desired data transmission rate.

During operation, data transmitted at lower rates can be fed in a parallel fashion into N:1 multiplexer 24, which generates a relatively high transmission rate data stream. The data stream can then be amplified by modulator driver 25 for driving optical modulator 2, which can be external to chip 29 and constructed from any appropriate optical material, such as lithium niobate. Modulator 2, in combination with light source 1, can provide a high speed optical signal.

Polarization scrambler 3 can be inserted after optical modulator 2 to randomize the polarization direction of the transmitted light. When light intensities along the principal polarization directions are the same, the system suffers a maximum power penalty due to PMD. Thus, by scrambling the polarization of the transmitted optical signal, the average PMD related power penalty is reduced because of a lower probability that the system will be locked in states with large power penalties.

Erbium Doped Fiber Amplifier (hereinafter, "EDFA") 4 can be inserted after scrambler 3 to provide sufficient power for transmission of the optical signal along, for example, a standard single mode fiber 5 to an optical network 35.

On the receiver side of the circuit, EDFA 6 can be used to compensate for gain lost during CD compensation by CD compensation unit 7 and PMD compensation unit 9. EDFA 6 also provides an overall gain control so that photodetector 11 and front-end amplifier 12 can operate in their proper dynamic ranges.

CD compensation unit 7 can be any type of CD compensator, and is preferably adaptively controlled. Examples of CD compensators that can be used in accordance with this invention are Fiber Bragg Gratings, Virtually Imaged-Phased Arrays, and Gires-Tournois Etalons. PMD compensation unit 9 should also be adaptively controlled. Examples of adaptively controlled PMD compensators are lithium niobate-based, liquid crystal-based, PLZT-based, and fiber squeezer-based polarization controllers. CD compensation controller 8, PMD compensation controller 10, and EDFA gain control unit 26 can provide feedback drive strength information to the corresponding compensation and amplification units. Error signals can be detected by IC 29 and processed by DSP or microprocessor chip 28. Optically compensated signal is detected by the photodetector 11.

IC 29 receives the electronic signal generated by photodetector 11. If IC 29 is constructed using InP, for example, photodetector 11 and IC 29 can be integrated on the same substrate, which provides an even more complete single-chip solution.

Front-end gain (amplifier) stage 12 can include a trans-impedance amplifier (hereinafter, "TIA") and other linear gain stages. Using a shunt feedback circuit, TIA 12 can provide a large trans-impedance gain with high dynamic range, good stability, and moderate noise. TIA 12 is preferably operated in the linear mode with minimal phase group delay.

Figure 2:
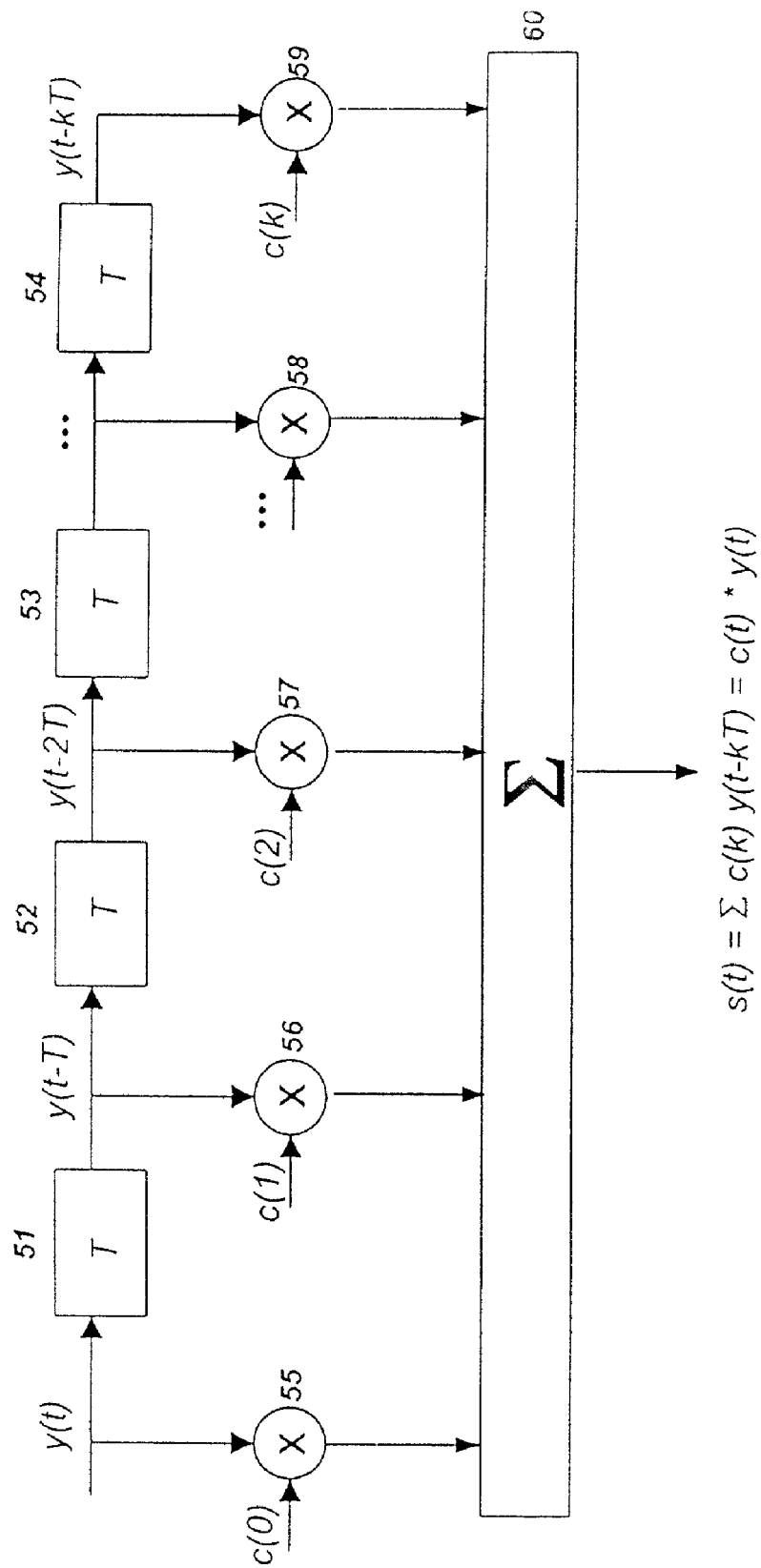
FIG. 2 shows a schematic diagram of a k-tap feed forward tranversal equalizer in accordance with this invention.

FIG. 2 shows a schematic diagram of an illustrative embodiment of k-tap feed forward equalizer (hereinafter, "FFE") 13 according to this invention. FFE 13 can provide additional compensation for both CD and PMD in the electronic domain. An FFE, sometimes called a transversal equalizer ("TE"), can be a finite-impulse response ("FIR") filter. Thus, an FFE is stable even if more taps are added. Attention should be paid, however, to FFE's high frequency noise. As explained more fully below, decision feedback equalizer (hereinafter, "DFE") 14 can be used to further equalize the distorted data.

During operation, each of delay elements 51, 52, 53, and 54 delay the input distorted data by T seconds at each tap. The output of each tap is then amplified by variable gain stages 55, 56, 57, 58, and 59, the gains of which are controlled by coefficients c(b 0), c(1), c(2), c(3), c(4), and c(5), respectively. Summation unit 60 provides the convolution between the input data and the coefficients.

Note that a convolution summation in the time domain corresponds to a multiplication in frequency domain. Thus, a transversal filter is essentially the same as a spectrum rectifier, which rectifies the distorted spectrum at frequencies separated by a periodic amount of 1/T. It will be appreciated that when the delay T is smaller than the bit period, the filter is essentially a fractional transversal filter. The number of taps in FFE 13 determines the degree of accuracy in the expansion of the convolution summation. It will be appreciated, however, that an FFE, although intrinsically stable, tends to amplify the high frequency noise.

Figure 3:
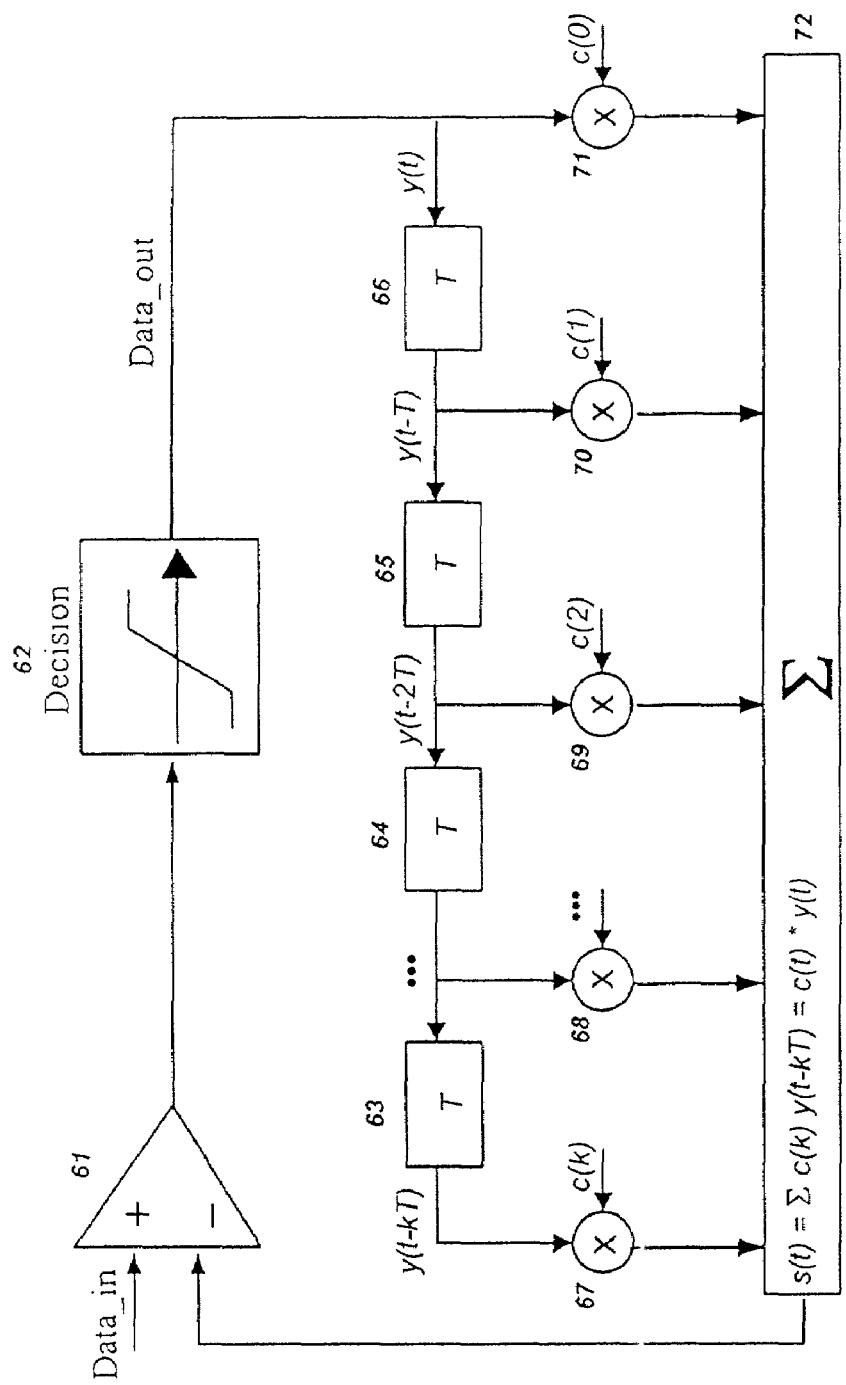
FIG. 3 shows a schematic diagram of a k-tap decision feedback equalizer in accordance with this invention.

FIG. 3 shows a schematic diagram of an illustrative embodiment of DFE 14 according to this invention. DFE 14 can be, for example, an infinite-impulse response filter (hereinafter, "IIR"). Thus, stability issues can limit the number of taps used in DFE 14. In other words, when more taps are included in DFE 14, the feedback may destabilize the loop.

After the decision stage, the data stream can be used to recover the clock, which is synchronized with the data. Clock and data recovery (hereinafter, "CDR") circuitry 17 (shown in FIG. 1) can be embedded in an adaptive receiver according to this invention. Thus, IC 29 preferably detects errors occurring during data detection and adjusts the decision threshold(s) adaptively. Error detection can include top and bottom error detectors 18 and 19, and respective top and bottom error counters 21 and 22. Error detection can also include left and right error detectors 30 and 32, and respective left and right error counters 31 and 33.

In DFE 14, a k-tap transversal filter, similar to FFE 13, shown in FIG. 2, can be inserted in the feedback branch, whose output is used as an error signal to rectify the distorted data input ("Data_in"). After decision circuit 62 (as shown in FIG. 3), analog input data is converted into a digital output ("Data_out"). Thus, the transversal filter in the feedback branch of DFE 14 processes digital data. Because DFE 14 can be an IIR type filter, which can be unstable, attention should be paid to controlling stability.

During operation, each of delay elements 63, 64, 65, and 66 of DFE 14 delays the feedback input by T seconds at each tap. The original signal and output of each tap is then multiplied by multipliers 71, 70, 69, 68, and 67 by respective amounts represented by coefficients c(0), c(1), c(2), . . . , and c(k). It will be appreciated that multiplication can be performed, for example, with adaptive gain controls in the analog or digital domain. Summation unit 72 provides the convolution between the input data and the coefficients.

Figure 4:
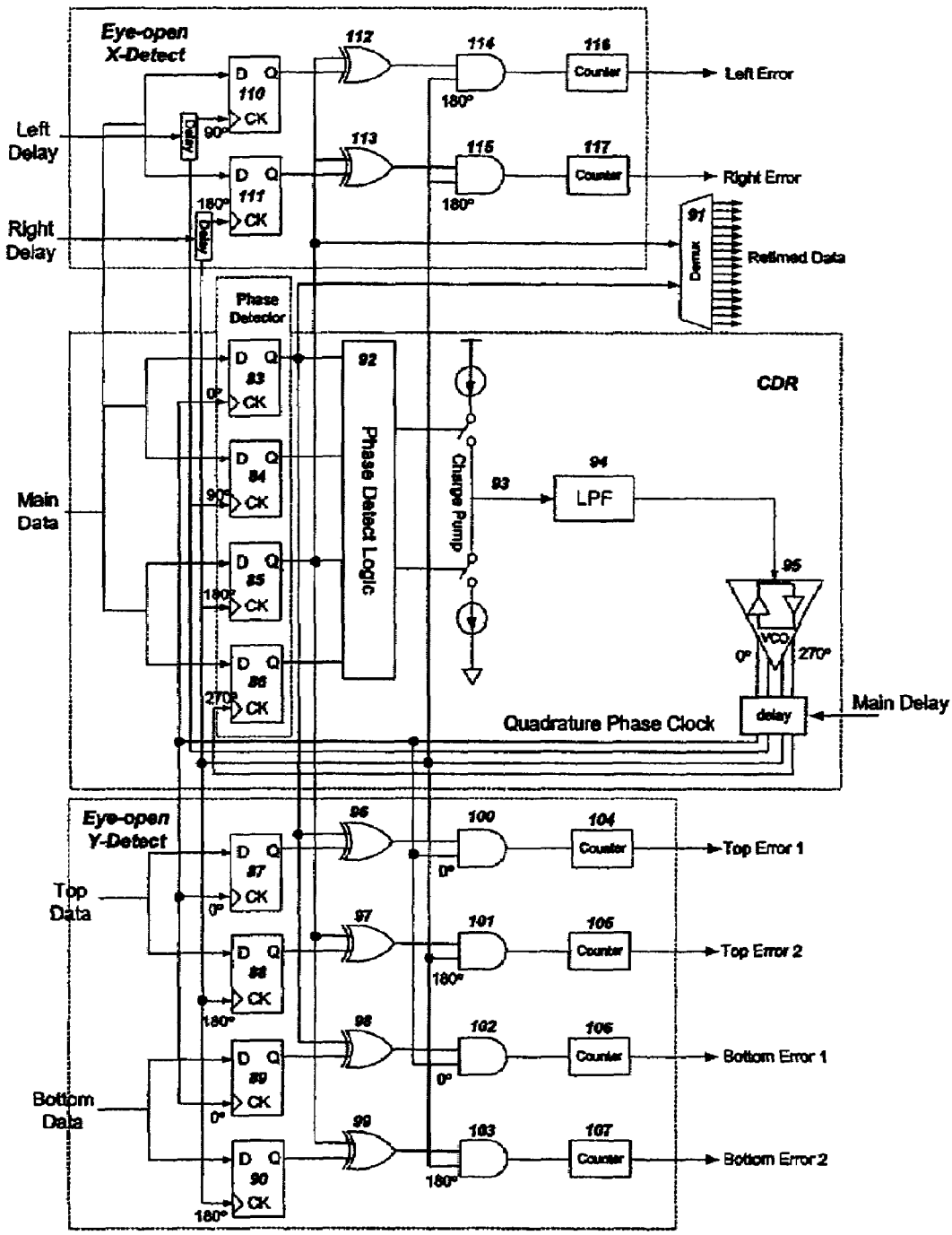
FIG. 4 shows a schematic diagram of an integrated solution, including a clock and data recovery circuit, and an eye opening measurement circuit for measurement, along both time and amplitude dimensions, for dispersion compensation in accordance with this invention.

FIG. 4 shows an illustrative embodiment of CDR and error detection circuitry according to this invention. As shown in FIG. 1, the circuitry provides an error signal to DSP or microprocessor chip 28. Programs that have been preloaded on DSP 28 can then process the error signals and generate one or more feedback control signals, after being converted to an analog signal by DACs 27, for various components, including, for example, EDFA gain controller 26, CD compensation controller 8, PMD compensation controller 10, and various decision circuits 13, 15, and 16 with adaptive thresholds and sample times. The recovered data is retimed and demultiplexed for transmission at a relatively lower data transmission rate by 1:N demultiplexer 23. Also, the recovered clock signal can be divided into a relatively low frequency with frequency divider 20.

As shown in FIG. 4, the phase detector can include four D-type flip-flops 83, 84, 85, and 86, which are clocked by quadrature phase clocks with, for example, 90 degrees of phase separation. The quadrature phase clocks can operate at half of the input data rate. The data stream can be sampled at equally spaced time points. Although FIG. 4 shows four such points, it will be appreciated that any number of time points can be used according to this invention.

In the locked state (i.e., when the recovered clock is synchronized to the input data) the clock units with 0 and 180 degrees of phase sample the data stream in the middle of the eye patterns and the clock units with 90 and 270 degrees of phase sample the data stream at the edge of the eye pattern. Phase detect logic circuitry 92 compares the binary phase detector outputs and generates up and down error pulses, which can be converted to a current mode by charge pump 93. It will be appreciated that low pass loop filter 94 determines the phase lock loop performance and thus affects the CDR jitter performance.

Voltage control oscillator 95 can be, for example, a ring oscillator because such oscillators can easily generate quadrature phase clocks. Also, as described above, oscillator 95 can operate, for example, at half the data rate. The recovered data can then be retimed and demultiplexed into a lower data rate by 2:N demultiplexer 91.

As also describe above, ASIC 29 preferably includes an integrated eye-opening detector or measuring device. The detector can measure the eye opening in both the time and amplitude directions. The detected left, right, top and bottom errors provide complete information about the eye quality of the received data. The error information can be critical for both optical and electronic adaptive compensation methods. The error information can also be used to adaptively tune the threshold and sample time for main data detection, which can result in a significantly reduced bit error rate.

As shown in FIG. 4, for eye-opening (i.e., "Y"-axis) detection, the main data detected with the main threshold are compared with the top and bottom data detected with the top and bottom thresholds at XOR gates 96–99. The error signals are then reshaped into an appropriate format (e.g., an RZ format) by AND gates 100–103 and respective errors are accumulated by error counters 104–107. By adjusting the top and bottom thresholds, the height of the data eye can be measured. To measure the eye-opening along the X-detection, the main data sampled by the main clock with 180 degrees of phase is compared with the data sampled by phase delayed clocks at XOR gates 112 and 113. The error signals are then reshaped into an appropriate format (e.g., an RZ format) by AND gates 114 and 115. Error counters 116 and 117 accumulate the respective errors.

By adjusting the delays, the opening of the data eye along X direction, namely along time axis, can be measured. The proposed error detection provides a complete measurement for the eye opening, (i.e., sometimes referred to as the "Q factor" of an eye pattern). The error signal can also serve as a feedback control signal for both electronic compensators (e.g., the FFE and DFE), and optical compensators (e.g., the CD compensator and PMD compensator. Therefore, ASIC 29 can provide a complete integrated solution for distortion compensation.

What is claimed is:

1. An adaptive receiver for receiving an optical signal, which includes a channel, from a fiber comprising:
   at least one optical device for compensating distortion in the channel of the optical signal;
   at least one photodetector circuit for converting said optical signal into an electrical signal;
   at least one electronic device for further compensating the distortion in the electronic signal;
   a clock and data recovery circuit for generating a recovered data signal and a clock signal from said electronic signal; and
   a post-processing circuit for error-correction in said recovered data signal;
   wherein the post-processing circuit generates a feedback control signal for one or more of the at least one electronic devices for further compensating the distortion.

2. The adaptive receiver according to claim 1, wherein said clock signal has a phase, and wherein said clock and data recovery circuit comprises:
   a phase detector for providing phase error information;
   a low-pass loop filter for determining a loop performance and generating a filtered error signal; and
   a voltage controlled oscillator for generating a sinusoidal waveform in response to receiving said filtered error signal.

3. The adaptive receiver of claim 2, wherein said phase detector comprises at least one D-type flip-flop.

4. The adaptive receiver of claim 3, wherein said phase detector comprises four D-type flip-flops.

5. The adaptive receiver of claim 2, wherein said phase error information comprises a voltage error signal, and wherein said circuit further comprises a charge pump for converting said voltage error signal into a current signal.

6. The adaptive receiver of claim 2, wherein said low-pass loop filter determines a phase lock loop performance.

7. The adaptive receiver of claim 6 wherein said low-pass loop filter determines a clock jitter performance of a clock and data recovery unit.

8. An adaptive transceiver comprising: an adaptive receiver for receiving an optical signal, including a channel, from a fiber, comprising:
   at least one optical device for compensating distortion in the channel of the optical signal,
   at least one photodetector circuit for converting said optical signal into an electrical signal,
   at least one electronic device for further compensating the distortion in the electronic signal,
   a clock and data recovery circuit for generating a recovered data signal and a clock signal from said electronic signal, and
   a post-processing circuit for error-correction in said recovered data signal; and
   an adaptive transmitter for generating a second optical signal;
   wherein the post-processing circuit generates a feedback control signal for one or more of the at least one electronic devices for further compensating the distortion.

9. The transceiver of claim 8, wherein each said at least one photodetector circuit comprises:
   a photodetector, which generates an electrical signal; and
   a front-end amplifier for amplifying said electrical signal.

10. The transceiver of claim 9 wherein said front-end amplifier comprises an amplifier selected from a group consisting of a trans-impedance amplifier, a series of linear amplifier stages, and a combination thereof.

11. The transceiver of claim 8, wherein said transmitter includes a controllable polarization scrambler.

12. An adaptive transceiver comprising:
   at least one adaptive optical distortion compensator having an optical compensator input and an optical compensator output;
   a photodetector circuit having a circuit input and a circuit output, said photodetector circuit comprising:
      a photodetector, and
      a trans-impedance amplifier coupled in series to the photodetector,
      wherein said circuit input is coupled to said optical compensator output;

at least one adaptive electronic equalizer having an equalizer input and an equalizer output, wherein said equalizer input is coupled to said photodetector circuit output;

an eye opening measurement circuit for measuring an eye opening along at least one dimension to generate dimensional information, said measurement circuit comprising a measurement circuit input and a measurement circuit output, wherein said measurement circuit input is coupled to said at least one adaptive electronic equalizer;

an adaptive decision unit for converting analog data to digital data using said dimensional information, wherein said adaptive decision unit comprises a decision unit input and a decision unit output, and wherein said decision unit input is coupled to said equalizer output, through which said dimensional information is provided;

a clock and data recovery circuit for providing at least one recovered clock signal with an adjustable phase and a recovered data signal, wherein said clock and data recovery circuit comprises a recovery circuit input and a recovery circuit output, wherein said recovery circuit input is coupled to said decision unit output, and wherein said recovery circuit output is coupled to said measurement circuit input for providing said data signal to said measurement circuit for comparison;

a post-processing IC for processing said dimensional information and providing feedback control signals to a compensating device selected from a group consisting of said at least one adaptive optical distortion compensator and said least one adaptive electronic equalizer; and an optical source capable of generating an optical signal, wherein said optical source comprises a source input and a source output.

13. The adaptive transceiver of claim 12 wherein said polarization scrambler comprises an optical polarization controller with a randomized control input.

14. The adaptive transceiver of claim 12 wherein said at least one adaptive optical distortion compensator is selected from a group consisting of a chromatic dispersion compensator, a polarization modes dispersion compensator, and a combination thereof.

15. The adaptive transceiver of claim 12 wherein said at least one adaptive electronic equalizer is selected from a group consisting of a transversal equalizer, a decision feedback equalizer, and a combination thereof.

16. The adaptive transceiver of claim 12 wherein said eye opening measurement circuit comprises an error detection circuit.

17. The adaptive transceiver of claim 16 wherein said error detection circuit generates error information for two eye opening dimensions.

18. The adaptive transceiver according to claim 10, wherein the error detection circuit analyzes a data eye opening along both time and amplitude dimensions, said error detection circuit comprising:
a sample time measurement unit comprising:
a left edge detector comprising:
a left delay unit for varying the phase of a left clock signal,
a left comparator unit which compares a recovered data signal with a left error signal based on said left clock signal, and
a left error counter for accumulating errors in said left error signal; and
a right edge detector comprising:
a right delay unit for varying the phase of a right clock signal,
a right comparator unit which compares a recovered data signal with a right error signal based on said right clock signal, and
a right error counter for accumulating errors in said right error signal; and
a threshold measurement unit.

19. The adaptive transceiver of claim 12 wherein said eye opening measurement circuit measures an eye opening along two dimensions to generate two dimensional parameters.

20. The adaptive transceiver of claim 12 wherein said adaptive decision unit converts analog data to digital data by adaptively adjusting at least one decision variable consisting of a threshold and a sample time.

21. The adaptive transceiver of claim 12 wherein said clock and data recovery circuit provides four recovered clock signals having an adjustable quadrature phase.

22. The adaptive transceiver of claim 12 wherein said post-processing IC comprises a digital signal processor.

23. The adaptive transceiver of claim 12 wherein said dimensional information comprises error information.

24. The adaptive transceiver of claim 23 wherein said dimensional information comprises error information for two dimensions.

25. The adaptive transceiver of claim 12 wherein said post-processing IC delivers all adaptive feedback signals for an automatic gain controller, a chromatic dispersion compensator, a polarization mode dispersion compensator, a feed-forward equalizer, a decision feedback equalizer, a decision threshold and sample time controller.

26. The transceiver of claim 12, further comprising a polarization scrambler, having a scrambler optical input coupled to said optical source output for providing a polarization-scrambled optical output signal.

27. An adaptive receiver for receiving an optical signal, which includes a channel, from a fiber comprising:
at least one optical device for compensating distortion in the channel of the optical signal;
at least one photodetector circuit for converting said optical signal into an electrical signal;
at least one electronic device for further compensating the distortion in the electronic signal;
a clock and data recovery circuit for generating a recovered data signal and a clock signal from said electronic signal; and
a post-processing circuit for error-correction in said recovered data signal;
wherein the post-processing circuit generates a feedback control signal for one or more of the at least one optical devices for compensating distortion, and for one or more of the at least one electronic devices for further compensating the distortion.

28. An adaptive receiver for receiving an optical signal, which includes a channel, from a fiber comprising:
at least one optical device for compensating distortion in the channel of the optical signal;
at least one photodetector circuit for converting said optical signal into an electrical signal;
at least one electronic device for further compensating the distortion in the electronic signal;
a clock and data recovery circuit for generating a recovered data signal and a clock signal from said electronic signal; and
a post-processing circuit for error-correction in said recovered data signal;

wherein the post-processing circuit generates a feedback control signal for the clock and data recovery circuit.

29. An adaptive transceiver comprising:

an adaptive receiver for receiving an optical signal, including a channel, from a fiber, comprising:

at least one optical device for compensating distortion in the channel of the optical signal, at least one photodetector circuit for converting said optical signal into an electrical signal, at least one electronic device for further compensating the distortion in the electronic signal, a clock and data recovery circuit for generating a recovered data signal and a clock signal from said electronic signal, and a post-processing circuit for error-correction in said recovered data signal; and an adaptive transmitter for generating a second optical signal;

wherein the post-processing circuit generates a feedback control signal for one or more of the at least one optical devices for compensating distortion, and for one or more of the at least one electronic devices for further compensating the distortion.

30. An adaptive transceiver comprising:

an adaptive receiver for receiving an optical signal, including a channel, from a fiber, comprising:

at least one optical device for compensating distortion in the channel of the optical signal, at least one photodetector circuit for converting said optical signal into an electrical signal, at least one electronic device for further compensating the distortion in the electronic signal, a clock and data recovery circuit for generating a recovered data signal and a clock signal from said electronic signal, and a post-processing circuit for error-correction in said recovered data signal; and an adaptive transmitter for generating a second optical signal;

wherein the post-processing circuit generates a feedback control signal for the clock and data recovery circuit.

* * * * *

UNITED STATES PATENT AND TRADEMARK OFFICE
CERTIFICATE OF CORRECTION

PATENT NO. : 7,224,911 B2  Page 1 of 1
APPLICATION NO. : 10/161747
DATED : May 29, 2007
INVENTOR(S) : Dai et al.

It is certified that error appears in the above-identified patent and that said Letters Patent is hereby corrected as shown below:

Col. 1, line 44, "increase the PMI)" should read -- increase the PMD --

Col. 2, line 29, "transport off a signal" should read -- transport of a signal --

Col. 5, line 34, "detector arid a right" should read -- detector and a right --

Signed and Sealed this

Fourth Day of September, 2007

JON W. DUDAS
*Director of the United States Patent and Trademark Office*